C. E. HOFFMAN.
Scales.
No. 56,940. Patented Aug. 7, 1866.
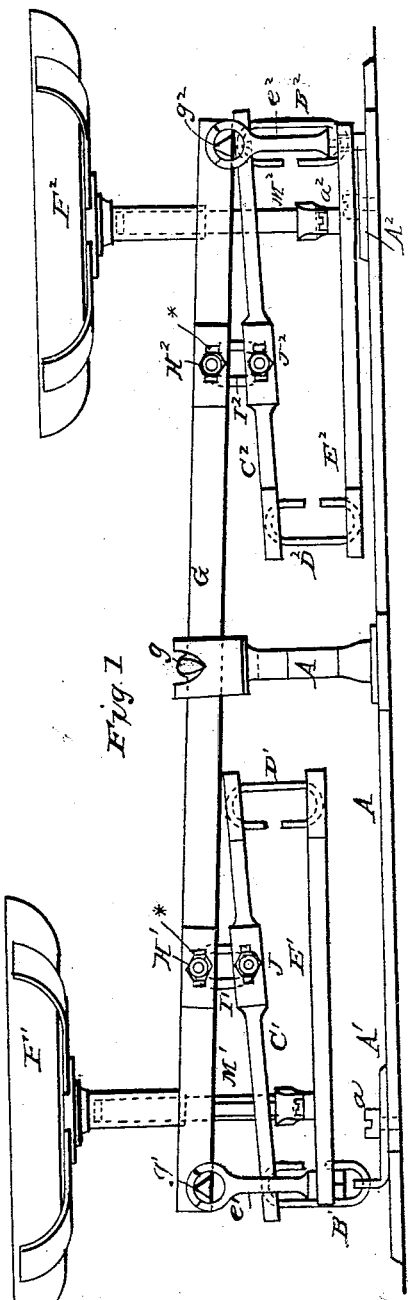
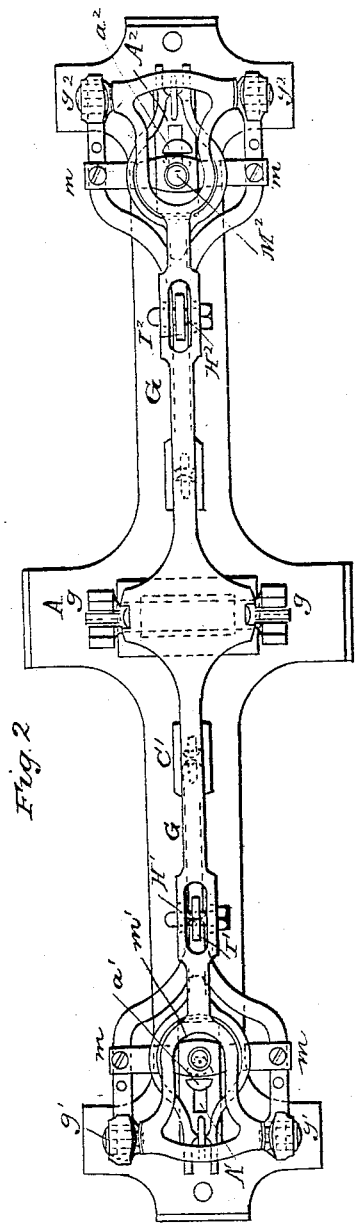
Witnesses
Thomas D. Stetson
D. W. Stetson
Inventor
Charles Edward Hoffmann

UNITED STATES PATENT OFFICE.

CHARLES E. HOFFMANN, OF JERSEY CITY, NEW JERSEY.

IMPROVEMENT IN SCALES.

Specification forming part of Letters Patent No. 56,940, dated August 7, 1866.

*To all whom it may concern:*

Be it known that I, CHARLES EDWARD HOFFMANN, of Jersey City, in the county of Hudson and State of New Jersey, have invented certain new and useful Improvements in Weighing-Scales; and I do hereby declare that the following is a full and exact description thereof.

My invention is an improvement on a form of scales which has long been known and which is very much esteemed by druggists and others for weighing small articles or small quantities of loose material.

My invention makes the scale more perfectly adjustable, stronger, cheaper, and more portable, or capable of being moved about, with less risk of injury or derangement.

I will first describe what I consider the best means of carrying out my invention, and will afterward designate the points which I believe to be new.

The accompanying drawings form a part of this specification, and represent the scale as separated from the casing in which it is usually protected. It may be used in any suitable style of case or without a case, as may be most convenient.

Figure 1 is a side elevation of the entire scale, with the pans in place for receiving the material to be weighed. Fig. 2 is a plan view of the scale with the pans removed.

Similar letters of reference indicate like parts in both the figures.

Tints are employed merely to aid in distinguishing parts, and do not imply differences of material. The material of the whole may be iron and steel.

A is a rigid frame-work. $A'$ $A^2$ are movable pieces secured upon A by means of the adjusting screws $a'$ $a^2$, and carrying inverted knife-edges (indicated in dotted lines in Fig. 1.) $B'$ $B^2$ are links extending upward from the knife-edges on $a'$ $a^2$ to corresponding knife-edges carried in the levers $C'$ $C^2$. These levers carry knife-edges at their opposite ends, which support links $D'$ $D^2$, which links, in turn, extend down to the knife-edges at the inner ends of the platform-pieces $E'$ $E^2$, which latter the scale is adapted to support always in horizontal positions, and thus to support the weight in the pans above without being disturbed by any change of position of the weight from one part of the pan to another.

G is the main lever of the scale. It is a stout single lever and is supported on the knife-edges $g$ $g$, as represented. It supports the main portion of the weight of the platforms $E'$ $E^2$ on the knife-edges $g'$ $g^2$, there being two of these knife-edges at each end of the lever G, arranged, as represented, to receive the weight from the rigid arms $e'$ $e^2$, which extend upward from the platforms $E'$ $E^2$. There are two arms on each of the platforms.

I have designated the parts $E'$ $E^2$ as platforms, because their positions are always horizontal; but I prefer to make them in the form of skeletons or slender forked framings, as indicated in the drawings. $M'$ $M^2$ are posts mounted on the platforms $E'$ $E^2$ by means of cross-bars secured by screws $m$, as represented. There may be several holes in the platforms to receive the screws $m$ in different positions, if desired.

$I'$ $I^2$ are links which extend from adjustable knife-edges in the lever G to adjustable edges in the levers $C'$ $C^2$. The said knife-edges in the lever G are denoted $H'$ $H^2$, and are adapted to be adjusted longitudinally in slots * and ** in the lever G by slackening the nuts represented and tightening them again after the readjustment has been effected. The adjustable knife-edges in the levers $C'$ $C^2$ are denoted $J'$ $J^2$, and are correspondingly formed and adjusted. Through the medium of these links $I'$ $I^2$ the portions of the loads placed on the pans $F'$ $F^2$ which are not supported on the bearings $g'$ $g^2$ are supported through the agency of the links $D'$ $D^2$ and the levers $C'$ $C^2$. The loads result in a downward pull on the links $I'$ $I^2$ and an upward pull on the links $B'$ $B^2$.

A change in the positions of the knife-edges $H'$ or $H^2$ increases or diminishes the effect of the weight placed on the pan at that end of the machine. A change in the position of the knife-edges $J'$ or $J^2$ will induce an analogous result, though in a different degree.

The adjustable knife-edges $H'$ and $J'$ should always be correspondingly adjusted, so that the lever $C'$ holds the links $B'$ and $D'$ as nearly vertical as possible, and the same is true of the opposite end of the machine. The two ends of the machine being similar, each to the other, a description of the peculiarities will in future be understood as applying to both, whether the same is expressed or not.

The lever G is made open at the point where the link I' is received, so that the link is received exactly in the center, with room to be adjusted endwise as much as is ever required in practice. The ends of the lever G are opened, as represented, to allow for the stems or posts M' M², on which the pans are supported, and the forks are connected across at their extreme ends, in order to increase the rigidity of the casting.

The levers C' C² are open at the points where they pass the posts M' M², above referred to, and describe a sufficiently large circuit around each post to avoid contact therewith under any circumstances while the scale is in use. When the scale is being transported or is violently agitated from any cause the levers C' C² strike against the posts M' M², and are supported thereby, so as to avoid any permanent derangement of their position. The moment the scale is brought to rest and properly leveled the levers C' C² and all the other parts assume their proper positions.

The pans F' F² are represented as supported on branching arms or spiders fixed on a tubular piece or socket adapted to slip onto the posts M' M². I usually make these pans of exactly equal weight, so that they may be changed from one side to the other without disturbing the balance.

Some of the advantages due to certain features of my invention may be separately enumerated as follows:

First, by reason of the fact that my knife-edges H' J' are adjustable in the slots in the levers G and C', as also, of course, in the corresponding parts at the other side of the scale, I am able to obtain a perfect adjustment of the several parts, so as to obtain a perfect balance, both loaded and unloaded, with far less labor than when the knife-edges at these points are fixed; and I am also able, by reason of the considerable extent to which these knife-edges may rapidly and easily move, to perfectly balance the scale, even when the beam G is, from want of care or skill in its construction, made considerably heavier at one end than at the other. The bearing-edges of ordinary knife-edges may be moved to small extent by grinding or honing on one side more than on the other; but it is obviously impossible to effect such changes to any great extent without much labor; and such ordinary mode of adjustment is objectionable, for the further reason that the treatment of a knife-edge in this manner lowers the edge and thus affects the delicacy of the scale. My movable knife-edges avoid these evils.

Second, by reason of the fact that my lever G is a single lever cast in one piece in the form represented, I am able to make the structure with greater strength, and at less cost and with less chance of straining, bending, or other derangement, when subjected to rough usage, than when the corresponding levers are duplicated and secured together by separate connections, as has been before practiced.

Third, by reason of the fact that my post M' is encircled, or nearly encircled, by the sub-lever C' and by the lever G, as represented, I am able to insure that these parts shall mutually support each other, when the scale is being transported or otherwise roughly handled, without subjecting the parts to any friction while the scale is in use. This arrangement avoids the necessity, experienced with other scales of this class, of providing an additional part to support the parts against too great lateral movements.

Fourth, by reason of the employment of my rigid pieces e' e², arranged, as represented, on the platforms E' E², and bearing on straight knife-edges g' g², as represented, I increase the stability of the structure and avoid the risk of the displacement of the flexible links heretofore employed to perform the functions analogous to those of the parts e' e². In former scales of this class flexible links were employed to perform functions analogous to those of my posts e' e², and such links acted, almost necessarily, on notched or hollowed knife-edges. Such arrangement involved more looseness than was necessary or desirable, and involved a risk of the links becoming displaced and catching on the high part of the knife-edge instead of always dropping into their proper holes or notches.

I propose to attach indexes to my parts E' E², as indicated in red outline.

I do not claim the general arrangement of the compound levers composing this scale; but,

Having now fully described my invention, what I claim as new therein, and desire to secure by Letters Patent, is—

1. Making the knife-edges H' J' adjustable in slots, or their equivalents, in the levers C' and G, and arranged to operate, relatively to said levers and their connections, substantially as and for the purpose herein specified.

2. Making the lever G in a single bar, with openings to receive the links I' I², and to support them centrally therein, by which arrangement I construct the scale at less expense and with less liability of derangement.

3. Receiving the post M' within openings in the levers C' and G, so that these parts shall mutually steady and support each other, substantially as herein specified.

4. The rigid posts e' e² and straight knife-edges g' g², in contradistinction to flexible links and hollowed or notched knife-edges, and arranged to operate substantially in the manner and with the advantages herein specified.

CHARLES EDWARD HOFFMANN.

Witnesses:
THOMAS D. STETSON,
D. W. STETSON.